United States Patent
Cyrot et al.

(10) Patent No.: US 10,408,288 B2
(45) Date of Patent: Sep. 10, 2019

(54) POSITIONING OF DISKS IN THE BRAKE RELEASED MODE FOR MULTI DISK BRAKES

(71) Applicant: Parker-Hannifin Corporation, Cleveland, OH (US)

(72) Inventors: Luc P. Cyrot, Mission Viejo, CA (US); Edward F. Hyrlik, Mission Viejo, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 40 days.

(21) Appl. No.: 15/496,037

(22) Filed: Apr. 25, 2017

(65) Prior Publication Data

US 2017/0321770 A1 Nov. 9, 2017

Related U.S. Application Data

(60) Provisional application No. 62/332,072, filed on May 5, 2016, provisional application No. 62/383,825, filed on Sep. 6, 2016.

(51) Int. Cl.
*F16D 55/46* (2006.01)
*F16D 65/62* (2006.01)
(Continued)

(52) U.S. Cl.
CPC .............. *F16D 55/46* (2013.01); *F16D 55/40* (2013.01); *F16D 65/62* (2013.01); *F16D 2065/1396* (2013.01)

(58) Field of Classification Search
CPC .... F16D 55/36; F16D 65/14; F16D 2125/582; F16D 3/04; F16D 55/46; F16D 13/683;
(Continued)

(56) References Cited

U.S. PATENT DOCUMENTS 2,218,616 A * 10/1940 McCune .................. B61H 5/00
                                                    188/153 R
2,326,960 A *  8/1943 McCune .................. B60T 1/062
                                                    188/106 A
(Continued)

FOREIGN PATENT DOCUMENTS

JP           2009210067 A        9/2009

*Primary Examiner* — Bradley T King
*Assistant Examiner* — Mahbubur Rashid
(74) *Attorney, Agent, or Firm* — Renner, Otto, Boisselle & Sklar, LLP (57) ABSTRACT

A multi-disk brake assembly includes a stator disk that is non-rotatable, a rotatable rotor disk arranged adjacently and coaxially with the stator disk, and an axial retention device. The rotor disk and the stator disk are axially moveable between an engaged position during braking operation and a disengaged position during a released mode of operation. The axial retention device is axially moveable and supports at least one of the disks. The axial retention device includes a set of axially translatable pins or bolts that are pushed by the disks during the braking operation and maintain a predetermined space between the disks during the released mode of operation. The predetermined space and position of the disks is maintained when the brake assembly is subject to forces due to vehicle acceleration or cornering.

19 Claims, 4 Drawing Sheets

(51) Int. Cl.
*F16D 55/40* (2006.01)
*F16D 65/02* (2006.01)

(58) Field of Classification Search
CPC ............... F16D 2048/0254; F16D 3/62; F16D 55/22655; F16D 55/227; F16D 55/38; F16D 59/02; F16D 65/62
See application file for complete search history.

(56) References Cited

U.S. PATENT DOCUMENTS

| | | | | |
|---|---|---|---|---|
| 2,349,132 A | * | 5/1944 | Baird | B60T 1/06 188/170 |
| 2,354,604 A | * | 7/1944 | Newell | F16D 55/41 188/152 |
| 2,551,253 A | * | 5/1951 | Du Bois | F16D 55/40 188/196 P |
| 2,657,773 A | * | 11/1953 | Driscoll | F16D 55/40 188/366 |
| 2,916,105 A | * | 12/1959 | Dasse | F16D 55/46 188/152 |
| 2,953,040 A | * | 9/1960 | Christenson | F16D 55/46 188/152 |
| 3,286,795 A | * | 11/1966 | Raciunas | F16D 55/40 188/196 R |
| 3,584,720 A | * | 6/1971 | Bark | F16D 13/52 188/72.3 |
| 3,791,498 A | * | 2/1974 | Wassermann | F16D 25/0638 188/264 E |
| 3,863,038 A | | 1/1975 | Kreitner et al. | |
| 4,279,330 A | * | 7/1981 | Pottorff | F16D 55/40 188/170 |
| 4,362,227 A | * | 12/1982 | Walton | F16D 55/36 188/72.3 |
| 4,396,101 A | * | 8/1983 | Black | F16D 13/52 192/70.2 |
| 4,466,524 A | * | 8/1984 | Lane | F16D 13/52 188/71.5 |
| 4,582,175 A | * | 4/1986 | Yanai | B60T 1/06 188/18 A |
| 5,383,544 A | * | 1/1995 | Patel | F16D 13/52 192/111.15 |
| 8,733,511 B2 | * | 5/2014 | Baumgartner | F16D 55/36 188/71.5 |
| 2004/0074711 A1 | | 4/2004 | Baylis | |
| 2004/0112688 A1 | | 6/2004 | Rancourt | |
| 2012/0037463 A1 | * | 2/2012 | Baumgartner | F16D 55/38 188/71.5 |

* cited by examiner

POSITIONING OF DISKS IN THE BRAKE RELEASED MODE FOR MULTI DISK BRAKES

RELATED APPLICATIONS

This application claims the benefit of U.S. Provisional Application No. 62/383,825 filed Sep. 6, 2016 and U.S. Provisional Application No. 62/332,072 filed May 5, 2016, both of which are hereby incorporated by reference.

FIELD OF INVENTION

The present invention relates generally to a multi-disk brake assembly.

BACKGROUND OF THE INVENTION

A multi-disk brake may be implemented in various types of vehicles. Multi-disk brakes are generally implemented when installation of a brake assembly preclude the use of disks with sufficiently large diameters. In operation, multi-disk brakes include a disk stack having loose spinning disks, or rotor disks, and stationary disks. The disks are engaged with one another when the brake is actuated and are released from engagement when the brake is released. Due to travel and lateral acceleration of the vehicle, the spinning disks and the stationary disks may contact one another when the brake is released or in an unactuated mode of operation.

Conventional multi-disk brake systems are suitable for certain applications, such as in aircrafts. In aircrafts, the multi-disk brake is generally only applied during the landing of the aircraft and the amount of ground travel is very limited. During the landing operation, the spinning disks rotate at the same speed as the aircraft wheel and contact between the disks is minimal. Thus, wear of the multi-disk brake is typically not an issue when the brake is implemented in an aircraft. Although suitable for aircrafts, conventional multi-disk brakes may not be suitable in applications where the disks are not braking the wheel directly, but are instead braking a gear box input shaft that drives the wheel. In this case, the RPM will be much higher than in an aircraft application. On ground vehicles, there will also be a significantly higher number of brake application than in aircrafts. The disks will also be subjected to more frequent inertia load or "g" loads when, for example, the vehicle is cornering.

SUMMARY OF THE INVENTION

The present application is directed towards a multi-disk brake assembly that may be implemented in a hybrid-type vehicle such as a truck or military vehicle. The described multi-disk brake is particularly suitable for braking systems that are implemented on the electrical or hydraulic motors that drive the wheels rather than in the wheels themselves. The present multi-disk brake assembly is advantageous as compared to a conventional multi-disk brake where the disks may endure quick wear that results in a lower life duration of the brake.

The multi-disk brake includes an axial retention device that supports at least one stator disk or rotor disk for maintaining a fixed and predetermined space between the disks when the brake is released. The spacing may be maintained under cornering loads or "g" loads that may cause axial movement of the disks in a conventional multi-disk brake. The axial retention device may include an axially translating pin or bolt set that holds the disks in a predetermined position when the brake is released to maintain the position of the disks and the predetermined spacing between the disks. Using the axial retention device is advantageous in that the rotor disk may freely spin at a relatively high RPM without engaging the stator disk when the brake is released. Thus, wear of the disks may be reduced to enable a longer life duration of the multi-disk brake assembly. An advantage of using the axially translating pin set is that when the brake is actuated, at least one of the pins may be pushed by the corresponding disk to allow engagement of the disks such that the pin set is functional to space the disks when the brake is released but does not affect the normal braking function of the brake assembly.

According to an aspect of the invention, a brake disk assembly includes a stator disk that is non-rotatable, a rotor disk arranged adjacently and coaxially with the stator disk, and an axial retention device. The rotor disk is rotatable. The stator disk and the rotor disk are axially moveable between an engaged position in which the stator disk and the rotor disk are engaged and a disengaged position in which the stator disk and the rotor disk are spaced apart. The axial retention device is axially moveable and supports at least one of the stator disk and the rotor disk for maintaining a position of the stator disk or the rotor disk and a predetermined space between the stator disk and the rotor disk when in the disengaged position. The axial retention device maintains the predetermined space when the brake disk assembly is subject to forces associated with vehicle acceleration or cornering.

According to an aspect of the invention, the axial retention device may include a set of spring-loaded pins or bolts that are used to locate the stator disk or the rotor disk and hold the disk in a predetermined position where the disks are spaced. When the stator disk and the rotor disk are disengaged, the disks may be biased against a static structure of the vehicle to prevent axial movement of the disks. The biasing force acting against the pins or bolts may be larger than the forces from acceleration or inertial loads acting on the brake disk assembly, such that the predetermined position of the disks and the predetermined space between the disks is maintained when the braking assembly is not actuated, or in a released mode of operation. When the stator disk and the rotor disk are engaged, the disks may push at least one of the pins or bolts in an opposite direction to the direction of the biasing force, such that the braking function of the brake disk assembly is unaffected by the spring-loaded pins or bolts.

According to an aspect of the invention, a braking system may be arranged in a vehicle and the braking system may have an actuated mode of operation and a released mode of operation. The braking system may include a static structure fixed to the vehicle, a rotor that is rotatable relative to the static structure, a disk stack having a stator disk and a rotor disk, and an axial retention device. The stator disk may be non-rotatable and supported by the static structure. The rotor disk may be supported by the rotor for rotation with the rotor and arranged adjacently and coaxially with the stator disk. The stator disk and the rotor disk may be axially moveable to engage one another during the actuated mode of operation and disengage from one another during the released mode of operation. The axial retention device may be axially moveable and support at least one of the stator disk and the rotor disk for maintaining a predetermined space between the stator disk and the rotor disk during the released mode of operation. The axial retention device may maintain the predetermined space when accelerated loads act on the brake disk assembly.

According to an aspect of the invention, a multi-disk brake assembly may include an actuated mode of operation and a released mode of operation. A method of operating the multi-disk brake assembly may include applying pressure to release a rotor disk and a stator disk from engagement during the released mode of operation, using a set of spring-loaded pins or bolts to bias the rotor disk and the stator disk in a first axial direction, wherein the set of spring-loaded pins or bolts position the rotor disk and the stator disk in a predetermined position to create a predetermined space between the rotor disk and the stator disk, maintaining the predetermined space between the rotor disk and the stator disk during the released mode of operation using a biasing force of the spring-loaded pins or bolts, and using the rotor disk or the stator disk to push at least one pin or bolt of the set of spring-loaded pins or bolts in a second axial direction during the actuated mode of operation.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

The principles of the present application have particular application in large vehicles such as aircrafts and military vehicles. A multi-disk brake assembly as described herein may be implemented in an aircraft, hybrid military vehicle, hybrid truck, or any other suitable vehicle that may use a multi-disk brake. The brake assembly may be particularly suitable for use in vehicles in which the disk brake components operate at higher rotational speeds and undergo more frequent application, as compared to aircrafts. The multi-disk brake assembly may be particularly suitable for large hybrid motor vehicles. Spinning disks of a multi-disk brake may rotate up to three times faster during normal non-braking operation of a military vehicle as compared with an aircraft. To prevent engagement of the fast spinning disks and static disks of the multi-disk brake during non-braking vehicle operation, the present multi-disk brake includes an axial retention device to maintain a predetermined space between the spinning disks and the static disks.

Figure 1:
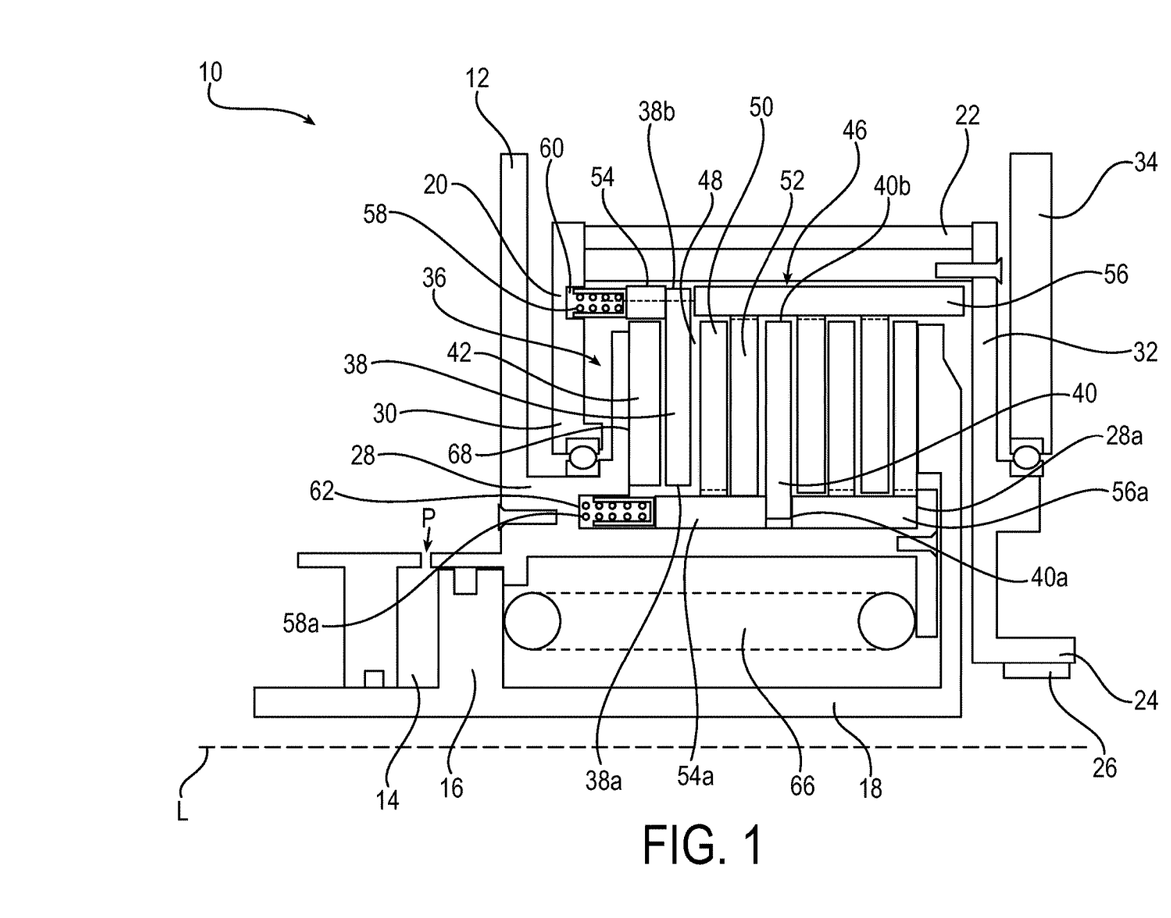
FIG. 1 is a schematic drawing depicting a sectional view of a multi-disk brake assembly according to a first embodiment.
Figure 2:
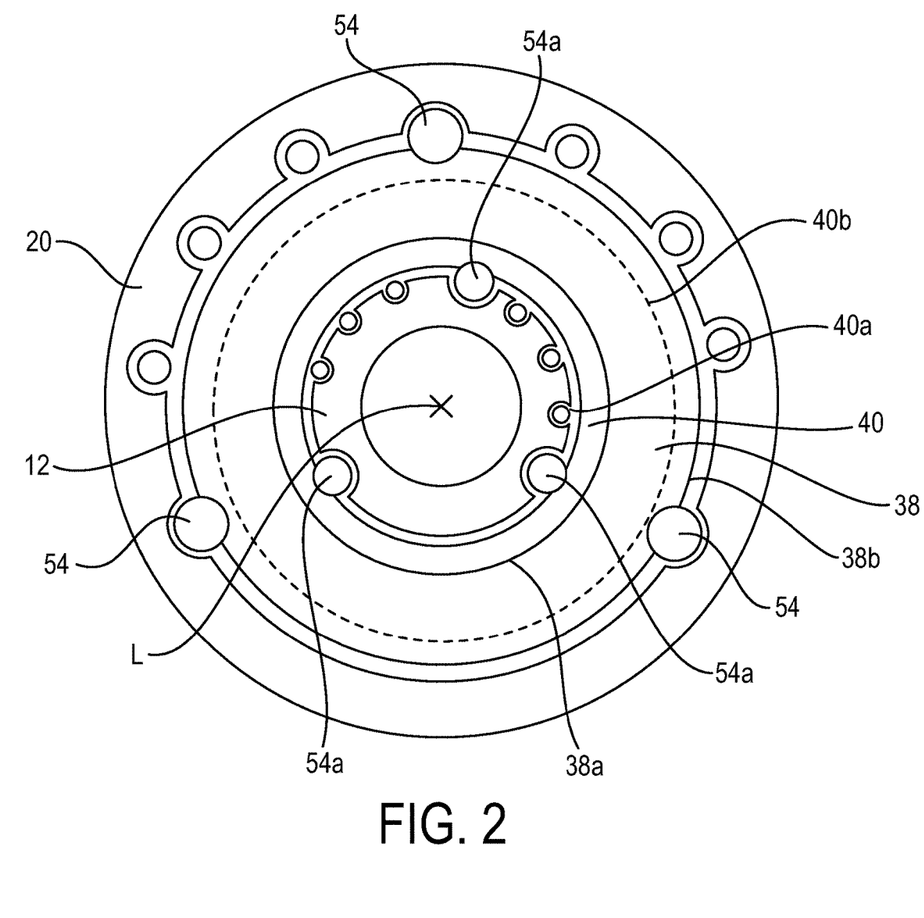
FIG. 2 is a schematic drawing depicting a front view of the multi-disk brake assembly of FIG. 1.

Referring now to FIGS. 1 and 2, a brake assembly 10 for a vehicle is schematically shown. The brake assembly 10 may be a multi-disk type brake assembly or system having an actuated mode of operation and a released mode of operation. The brake assembly 10 may provide a braking function for the vehicle during the actuated mode of operation and the brake may be released to move from the actuated mode of operation to the released mode of operation. The brake assembly 10 may be interposed between a driving unit, such as a hydraulic motor, and a driven unit, such as a gear box associated with a wheel. The brake assembly 10, motor, and gearbox may be secured together using any suitable components. As schematically shown in FIG. 1, the brake assembly 10 may include a stationary brake housing 12. The brake housing 12 may include a cylindrical chamber 14 that houses a slideable annular piston 16. The piston 16 may include an axially extending piston skirt 18.

The brake housing 12 may include a rotor 20 that is journaled within the brake housing 12 via any suitable bearing. Rotor laminations 22 may be provided to couple the rotor 20 with an output shaft 24 of the motor. The output shaft 24 may include splines 26 such that the connection between the rotor 20 and the output shaft 24 of the motor is a splined connection. The brake housing 12 may include a bearing carrier or a torque tube 28 that is secured to the brake housing 12 and coupled to a first portion 30 of the motor rotor 20. The first portion 30 may be located at one end of the rotor 20 and the rotor 20 may include a second portion 32 at an opposite end of the rotor 20. The second portion 32 may be located by a bearing on a fixed portion 34 of the motor stator. The output shaft 24 is connected to the input shaft of the gear box, such that a driving connection may be established between the rotor 20 and the input shaft of the gearbox that is associated with a wheel of the vehicle.

The brake assembly 10 generally includes a brake disk stack 36 that includes a plurality of interleaving rotor disks and stator disks that are keyed to the rotor 20 and the stationary disk housing 12, respectively. The piston skirt 18 may extend axially over the disk stack 36. Each of the interleaved rotor and stator disks may have a thickness between 3 and 4 millimeters or any other suitable dimensions as may be warranted for a particular application. The brake disk stack 36 may include at least one rotor disk 38 having an inner diameter 38a and an outer diameter 38b. The rotor disk 38 may be supported within the rotor 20 for rotation with the rotor 20. The rotor disk 38 may be rotatable about a longitudinal axis L. The rotor disk 38 may be splined such that the rotor disks float on corresponding splines of the rotor 20. Alternatively, the locating set of pins may provide an anti-rotation function. The faces of the rotor disk 38 may be formed of a friction material, such as a brake pad. Each of the plurality of rotor disks may have similar features to the rotor disk 38.

The brake disk stack 36 may also include at least one stator disk 40 that is non-rotatable and arranged along the longitudinal axis L. The stator disk 40 may have an inner diameter 40a and an outer diameter 40b and may be formed of a metal. The dimensions of the inner and outer diameters of the rotor disks and the stator disks may vary or may be the same. Another stator disk 42 may be an end-most disk of the brake disk stack 36 and coupled with the stationary housing 12 via the torque tube 28. The stator disk 40 may be supported within the torque tube 28 that is fixed to the brake housing 12. The brake disk stack 36 may include a plurality of stator disks and each of the plurality of stator disks may have similar features to the stator disk 40.

The disks may be arranged such that the outer diameter of one of the rotor disk 38 and the stator disk 40 is farther away from the longitudinal axis L in a first longitudinal direction. For example, as shown in FIG. 1, the outer diameter 38*b* of the rotor disk 38 is closer to the rotor 20 as compared with the outer diameter 40*b* of the stator disk 40. The rotor disk 38 and the stator disk 40 may be axially moveable along the longitudinal axis L to move between an engaged position where the disks of the disk stack 36 are engaged and a disengaged position where the disks are spaced. The disk stack 36 may be in the engaged position during the actuated mode of operation of the brake assembly 10 and in the disengaged position during the released mode of operation.

The brake assembly 10 may further include an axial retention device 46 for maintaining an axial space 48 between a rotor disk and a stator disk during the released mode of operation. The axial space 48 may have a predetermined length and the disk stack 36 may have a plurality of axial spaces that exist between each of the rotor disks and the stator disks. As shown in FIG. 1, the axial space 48 may be between the rotor disk 38 and another stator disk 50. Another axial space may exist between the rotor disk 38 and the end stator disk 42, or between the stator disk 40 and another rotor disk 52. Each disk in the disk stack 36 may be spaced from disks that are adjacent to the disk on either side of the disk. Generally, the axial retention device 46 corresponding to the rotor disk 38 or the stator disk 40 may act as a locating device for the rotor disk 38 or the stator disk 40, such that the axial retention device 46 is used to position the disk in a predetermined position and maintain the spaces between the disk and adjacent disks. The axial retention device 46 is advantageous in that the position of the disks and the predetermined spaces between the disks is maintained when the brake assembly 10 is subject to forces from vehicle acceleration or cornering when the brake assembly 10 is unactuated.

As best shown in FIG. 1, the axial retention device 46 may include at least one set of pins 54, 56 corresponding to the rotor disk 38. Each rotor disk may have a pin set. The pin set may include two groups of three pins, where the first group of pins and the second group of pins are axially aligned. Each rotor disk may be associated with six pins. The three pins of both the first group and the second group may be distributed evenly around the longitudinal axis L of the disk stack 36 to keep the disks parallel to one another. The axial retention device 46 may include a plurality of sets of pins, where a first set of pins may be provided for the rotor disk 38 and a second set of pins may be provided for the stator disk 40. The brake assembly 10 may include a plurality of rotor disks and stator disks that each have a corresponding set of pins, such that a set of pins may be provided for each disk. Each disk may be associated with six pins.

The set of pins 54, 56 may be axially moveable or axially translatable. The set of pins 54, 56 may extend axially along the length of the disk stack 36. The set of pins 54, 56 may include a first pin, or a driving pin 54, and a second pin, or a stopping pin 56. The set of pins 54, 56 may include a plurality of driving pins and a plurality of stopping pins. As best shown in FIG. 2, the set of pins 54, 56 may include three driving pins 54 and three stopping pins (not shown in FIG. 2), or any suitable number of pins. The pins may be circumferentially and evenly spaced from one another. An end portion of the corresponding rotor disk 38 may be interposed between the driving pin 54 and the stopping pin 56. When the braking assembly 10 is in the released mode of operation and the disk stack 36 is disengaged, the driving pin 54 and the stopping pin 56 may clamp the rotor disk 38 to hold the rotor disk 38 in a predetermined position or location against a support structure that prevents axial movement of the set of pins 54, 56. The driving pin 54 may be biased in a first axial direction against a face of the rotor disk 38, such that an opposite face of the rotor disk 38 engages against the stopping pin 56. The stopping pin 56 may engage against the second portion 32 of the rotor 20 when the braking assembly 10 is in the released mode of operation, such that axial movement of the rotor disk 38 is prevented.

The axial retention device 46 may include a second set of pins 54*a*, 56*a* that are associated with the stator disk 40 and may extend axially along the disk stack 36. The second set of pins 54*a*, 56*a* may include a first pin, or a driving pin 54*a*, and a second pin, or a stopping pin 56*a*. The second set of pins 54*a*, 56*a* may include a plurality of driving pins and a plurality of stopping pins. As best shown in FIG. 2, the second set of pins 54*a*, 56*a* may include three driving pins and three stopping pins (not shown in FIG. 2), or any suitable number of pins. An internal portion of the stator disk 40 that surrounds the inner diameter 40*a* of the stator disk 40 may be interposed between the driving pin 54*a* and the stopping pin 56*a*. The driving pin 54*a* and the stopping pin 56*a* may clamp the stator disk 40 to hold the stator disk 40 in a predetermined position or location when the braking assembly 10 is in the released mode of operation. The driving pin 54*a* may be biased in a first axial direction against a face of the stator disk 40, such that an opposite face of the stator disk 40 engages against the stopping pin 56*a*. The stopping pin 56*a* may engage against an end wall 28*a* of the torque tube 28 when the braking assembly 10 is in the released mode of operation, such that movement of the stator disk 40 is prevented.

Axial lengths of the pins may vary and the set of pins 54, 54*a*, 56, 56*a* may be arranged or spaced in any suitable configuration for retaining the axial spaces between the disks in the disk stack 36. The axial lengths of the driving pin and the stopping pin may be dependent on the location of the corresponding disk within the disk stack. For example, a driving pin corresponding to the rotor disk 52 may have a longer axial length than the driving pin 54 for the rotor disk 38. Accordingly, a stopping pin corresponding to the rotor disk 52 may have a shorter axial length than the stopping pin 56 for the rotor disk 38. In a similar manner, a driving pin corresponding to the stator disk 50 may have a shorter axial length than the driving pin 54*a* for the stator disk 40. A stopping pin corresponding to the stator disk 50 may have a longer axial length than the stopping pin 56*a* for the stator disk 40.

The driving pin 54 associated with the rotor disk 38 may be engageable with a biasing member 58. An end of the driving pin 54 may be engageable or connected with the biasing member 58 and an opposite end may be engageable with the rotor disk 38. The biasing member 58 may be a pre-loaded coil compression spring, but any suitable type of spring may be used. The biasing member 58 may include a plurality of springs that are engageable with the driving pin 54. The biasing member 58 may include three springs that are engageable with the three driving pins 54, but any suitable number of springs or driving pins may be used. A bore 60 may be formed in the rotor 20 and the bore 60 may receive the biasing member 58. The bore 60 may be integral with the rotor 20. The biasing member 58 may be engageable with the driving pin 54 to move the rotor disk 38 towards the stopping pin 56 in a first axial direction. The driving pin 54, the rotor disk 38, and the stopping pin 56 may be moved towards the second portion 32 of the rotor 20. The springs, or the biasing member 58, may be pre-loaded such that a spring force of the springs is greater than the forces dues to vehicle acceleration or cornering that act on the brake assembly 10, such that the springs may hold the rotor disk 38 against a support structure, such as the second portion 32 of the rotor 20. Using the spring-loaded pin set may prevent axial movement of the rotor disk 38 during the released mode of operation.

The driving pin 54a associated with the stator disk 40 may also be engageable with a biasing member 58a. An end of the driving pin 54a may be engageable or connected with the biasing member 58a and an opposite end may be engageable with the stator disk 40. The biasing member 58a may be a pre-loaded coil compression spring, but any suitable type of spring may be used. The biasing member 58a may include a plurality of springs. The biasing member 58a may include three springs that are engageable with the three driving pins 54a. Any other suitable number of springs and driving pins may be used. A bore 62 may be formed in the torque tube 28 or the stationary housing 12 and the bore 62 may receive the biasing member 58a. The bore 62 may be integral with the torque tube 28. The biasing member 58a may be engageable with the driving pin 54a to move the stator disk 40 towards the stopping pin 56a in the first axial direction. The driving pin 54a, the stator disk 40, and the stopping pin 56a may be moved towards the end wall 28a of the torque tube 28. The springs may be pre-loaded such that a spring force of the springs is greater than acceleration loads or inertial loads that act on the brake assembly 10. The springs may hold the stator disk 40 against a support structure, such as the end wall 28a of the torque tube 28.

Although three sets of evenly distributed pins per disk is preferred, each rotor and stator disk in the disk stack 36 may have a corresponding pin set and each pin set may have a structure similar to the pin sets described herein. In an exemplary embodiment, the brake assembly 10 may include nine floating disks, 54 pins, and 27 springs.

When the brake assembly 10 is actuated for the braking function, the piston skirt 18 may be moveable and a brake spring 66 may be compressed such that the brake disk stack 36 may be compressed. The disk stack 36 may be biased against an abutment surface 68 of the torque tube 28. The rotor and stator disks may be pressed into frictional engagement to retain the rotor 20 against rotation and brake the gear box input shaft that drives the wheel. When the disk stack 36 is compressed during the actuated mode of operation of the braking assembly 10, the rotor disk 38 may move in a second axial direction opposite the first axial direction and the direction of the force exerted by the biasing member 58, such that the rotor disk 38 pushes the driving pin 54 and the biasing member 58, enabling engagement between the rotor disk 38 and the end stator disk 42. The driving pin 54 may be an anti-rotation pin, in that the driving pin 54 may be moved to allow the rotor disk 38 to engage adjacent disks such that the rotor disk 38 is non-rotatable. The stopping pin 56 may be freely floating in an axial direction and the stopping pin 56 may be disengaged from the rotor disk 38, such that the stopping pin 56 does not affect the engagement of the disks or the braking function.

When the disk stack 36 is compressed, the stator disk 40 may also move in the second axial direction to push the driving pin 54a and the biasing member 58a in the second axial direction, enabling the stator disk 40 to engage the rotor disk 52. The stopping pin 56a may be freely floating in an axial direction and the stopping pin 56a may be disengaged from the stator disk 40, such that the stopping pin 56a does not affect the engagement of the disks or the braking function. Using the axially translatable pin set is advantageous in that the normal braking function of the brake assembly 10 is not affected. Each of the driving pins 54, 54a may be pushed by the corresponding disks and the stopping pins 56, 56a may be disengageable from the corresponding disks such that the stopping pins do not affect the normal braking function. The driving pins and stopping pins may effectively perform the position and spacing retention function only when the brake assembly 10 is released and the disk stack 36 is in the disengaged position.

As shown in FIG. 1, a hydraulic or pneumatic pressure P may be applied to the cylindrical chamber 14 to release the brake assembly 10 from the actuated mode of operation and release the engagement of the disks in the disk stack 36. The fluid pressure may force the piston 16 and the piston skirt 18 in the first axial direction to release the axial pressure compressing the disk stack 36. Releasing the axial pressure and the disk stack 36 enables the rotor 20 to be driven by the connected gear box. The pressure P may be supplied by any suitable source of hydraulic pressure conventionally utilized in disk braking systems.

When the brake assembly 10 is released, the disks of the brake disk stack 36 may also move in the first axial direction by way of the spring force of the biasing members 58, 58a forcing the driving pins 54, 54a to engage against the corresponding disks 38, 40. The disks 38, 40 subsequently engage against the stopping pins 56, 56a and the stopping pins 56, 56a are prevented from farther axial movement by a support structure, such as a portion of the rotor 20 or of the torque tube 28. Axial movement of the disks may also be prevented when the stopping pins 56, 56a are engaged against the support structure. The set of pins and the biasing member may maintain the position of the corresponding disk such that the disk may not move axially. Normal travel of the vehicle may cause acceleration or inertial loads to act on the brake assembly 10, but the pins maintain the disk position and the axial space between the disks.

The predetermined position of each disk may be a position that enables the rotor disks to freely spin with little or no engagement against an adjacent disk during the released mode of operation of the brake assembly. The predetermined position may be dependent on the preferred spacing between the disks. In an exemplary configuration, the disks may each be spaced from one another by a distance between 0.08 millimeters and 1.20 millimeters when in the disengaged position. The disks may each be evenly spaced or the spaces between the disks may vary between 0.08 millimeters and 1.20 millimeters. In addition to decreasing wear on the disks, maintaining the axial spaces may also be advantageous for reducing vibration and noise during normal non-braking movement of the vehicle.

Figure 3:
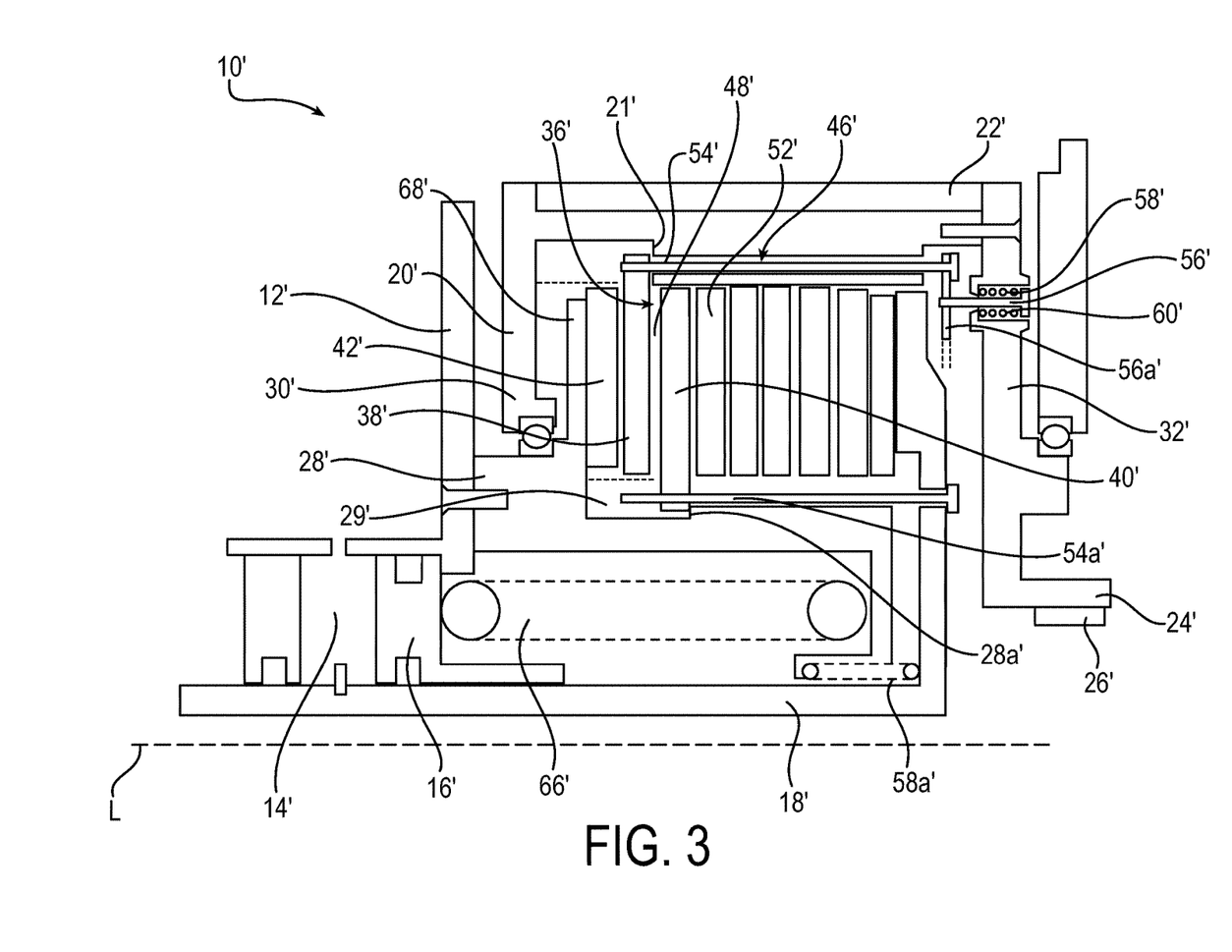
FIG. 3 is a schematic drawing depicting a sectional view of a multi-disk brake assembly according to a second embodiment.

Referring now to FIG. 3, a second exemplary embodiment of the multi-disk brake assembly 10' is schematically shown. As previously described, the brake assembly 10' may include a stationary brake housing 12', a cylindrical chamber 14', a slideable annular piston 16', an axially extending piston skirt 18', a rotor 20', rotor laminations 22', and an output shaft 24' of the motor having splines 26'. The rotor 20' may include a first portion 30' and a second portion 32' that may be coupled to an input shaft of the gear box associated with the vehicle wheel. The brake housing 12' may include a torque tube 28'. The brake assembly 10' may include a brake disk stack 36' that includes a plurality of interleaving rotor disks and stator disks that are keyed to the rotor 20' and the stationary disk housing 12', respectively. The brake disk stack 36' may include at least one rotor disk 38'. As shown in FIG. 3, the rotor disk 38' may be supported by the rotor 20' for rotation with the rotor 20'. The rotor disk 20' may be rotatable about a longitudinal axis L'.

The brake disk stack 36' may also include at least one stator disk 40' that is non-rotatable and arranged along the longitudinal axis. A stator disk 42' may be an end-most disk of the brake disk stack 36'. The stator disk 40' may be supported by the torque tube 28' that is fixed to the brake housing 12'. The rotor disk 38' and the stator disk 40' may be axially moveable along the longitudinal axis L' to move between the engaged position where the disks of the disk stack 36' are engaged and the disengaged position where the disks are spaced. The disk stack 36' may be in the engaged position during the actuated mode of operation of the brake assembly 10' and in the disengaged position during the released mode of operation.

The brake assembly 10' may further include an axial retention device 46' for maintaining an axial space 48' between the rotor disk 38' and the stator disk 40' during the released mode of operation. As best shown in FIG. 3, the axial retention device 46' may include at least one set of bolts 54', 56' corresponding to the rotor disk 38'. Each rotor disk may have a bolt set and in an exemplary configuration, each rotor disk may include three sets of bolts. The axial retention device 46' may include a plurality of sets of bolts, where a first set of bolts may be provided for the rotor disk 38' and a second set of bolts may be provided for the stator disk 40'. The brake assembly 10' may include a plurality of rotor disks and stator disks that each have a corresponding set of bolts, such that a set of bolts may be provided for each disk. The set of bolts may include two or three bolts per disk, or any other suitable number of bolts. In an exemplary configuration, the brake assembly 10' may include 30 bolts.

The set of bolts 54', 56' may be axially moveable or axially translatable. The set of bolts 54', 56' may extend axially along the length of the disk stack 36'. The set of bolts 54', 56' may include a first bolt, or a stopping or pulling bolt 54', and a second bolt, or a driving bolt 56'. The pulling bolt 54' may be secured to an end portion of the corresponding rotor disk 38'. When the braking assembly 10' is in the released mode of operation and the disk stack 36' is disengaged, the bolt set may hold the rotor disk 38' in a predetermined position or location against a support structure that prevents axial movement of the set of bolts 54', 56'. The bolt 54' may be biased in a first axial direction, such that axial movement of the rotor disk 38' is prevented. The axial retention device 46' may include a second set of bolts 54a' that are associated with the stator disk 40' and may extend axially along the disk stack 36'. The bolt 54a' may be secured to an end portion of the stator disk 40'. The bolt 54a' may hold the stator disk 40' in a predetermined position or location when the braking assembly 10' is in the released mode of operation. The bolt 54a' may be biased in a first axial direction, such that the stator disk 40' engages against an end wall 28a' of the torque tube 28' when the braking assembly 10' is in the released mode of operation, such that movement of the stator disk 40' is prevented. Axial lengths of the bolts may vary and the set of bolts 54', 54a', 56' may be arranged or spaced in any suitable The bolt set 54', 56' associated with the rotor disk 38' may be engageable with a biasing member 58'. One of the bolts 56' may be engageable or connected with the biasing member 58' and the other of the bolts 54' may be engageable with the rotor disk 38'. The bolts 54', 56' may be radially offset from one another and connected to one another via a radially extending member 56a'. The biasing member 58' may be a pre-loaded coil compression spring, but any suitable type of spring may be used. The biasing member 58' may include a plurality of springs that are engageable with the bolt 56'. A bore 60' may be formed in the second portion 32' of the rotor 20' and the bore 60' may receive the biasing member 58'. The bore 60' may be integral with the rotor 20'. The biasing member 58' may be engageable with the bolt 56' to pull the rotor disk 38' in a first axial direction. The pulling bolt 54', the rotor disk 38', and the driving bolt 56' may be moved towards the second portion 32' of the rotor 20'. The springs, or the biasing member 58', may be pre-loaded such that a spring force of the springs is greater than the forces dues to vehicle acceleration or cornering that act on the brake assembly 10', such that the springs may hold the rotor disk 38' against a support structure, such as a portion or side wall 21' of the rotor 20'. Using the spring-loaded bolt set may prevent axial movement of the rotor disk 38' during the released mode of operation.

The bolt 54a' associated with the stator disk 40' may be axially moveable via a biasing member 58a'. An end of the bolt 54a' may be engageable or connected with a portion of the piston 16' that is engageable with the biasing member 58a'. The biasing member 58a' may be a pre-loaded coil compression spring, but any suitable type of spring may be used. The biasing member 58a' may include a plurality of springs and the biasing member 58a' may be engageable between the piston 16' and a portion of the torque tube 28' or the stationary housing 12'. The biasing member 58a' may be engageable with the portion of the piston 16', such that the piston is spring-loaded, to pull the bolt 54' and subsequently the stator disk 40' against an end wall 28a' of the torque tube 28'. The springs may be pre-loaded such that a spring force of the springs is greater than acceleration loads or inertial loads that act on the brake assembly 10'. The springs may hold the stator disk 40' against a support structure, such as the end wall 28a' of the torque tube 28'. The torque tube 28' may also define a locating groove 29'. Each rotor and stator disk in the disk stack 36' may have a corresponding bolt set and each bolt set may have a structure similar to the bolt sets described herein. In an exemplary embodiment, the brake assembly 10' may include 30 bolts and 4 springs.

When the brake assembly 10' is actuated for the braking function, the piston skirt 18' may be moveable and a brake spring 66' may be compressed. The piston 16' may be spring-loaded via biasing member 58a' The disk stack 36' may be biased against an abutment surface 68' of the torque tube 28'. The rotor and stator disks may be pressed into frictional engagement to retain the rotor 20' against rotation and brake the gear box input shaft that drives the wheel. When the disk stack 36' is compressed during the actuated mode of operation of the braking assembly 10', the rotor disk 38' may move in a second axial direction opposite the first axial direction and the direction of the force exerted by the biasing member 58', such that the rotor disk 38' pushes the bolt 54' and the biasing member 58', enabling engagement between the rotor disk 38' and the end stator disk 42'. When the disk stack 36' is compressed, the stator disk 40' may also move in the second axial direction, enabling the stator disk 40' to engage another rotor disk 52'. The bolt sets may be configured to perform the position and spacing retention function only when the brake assembly 10' is released and the disk stack 36' is in the disengaged position.

Figure 4:
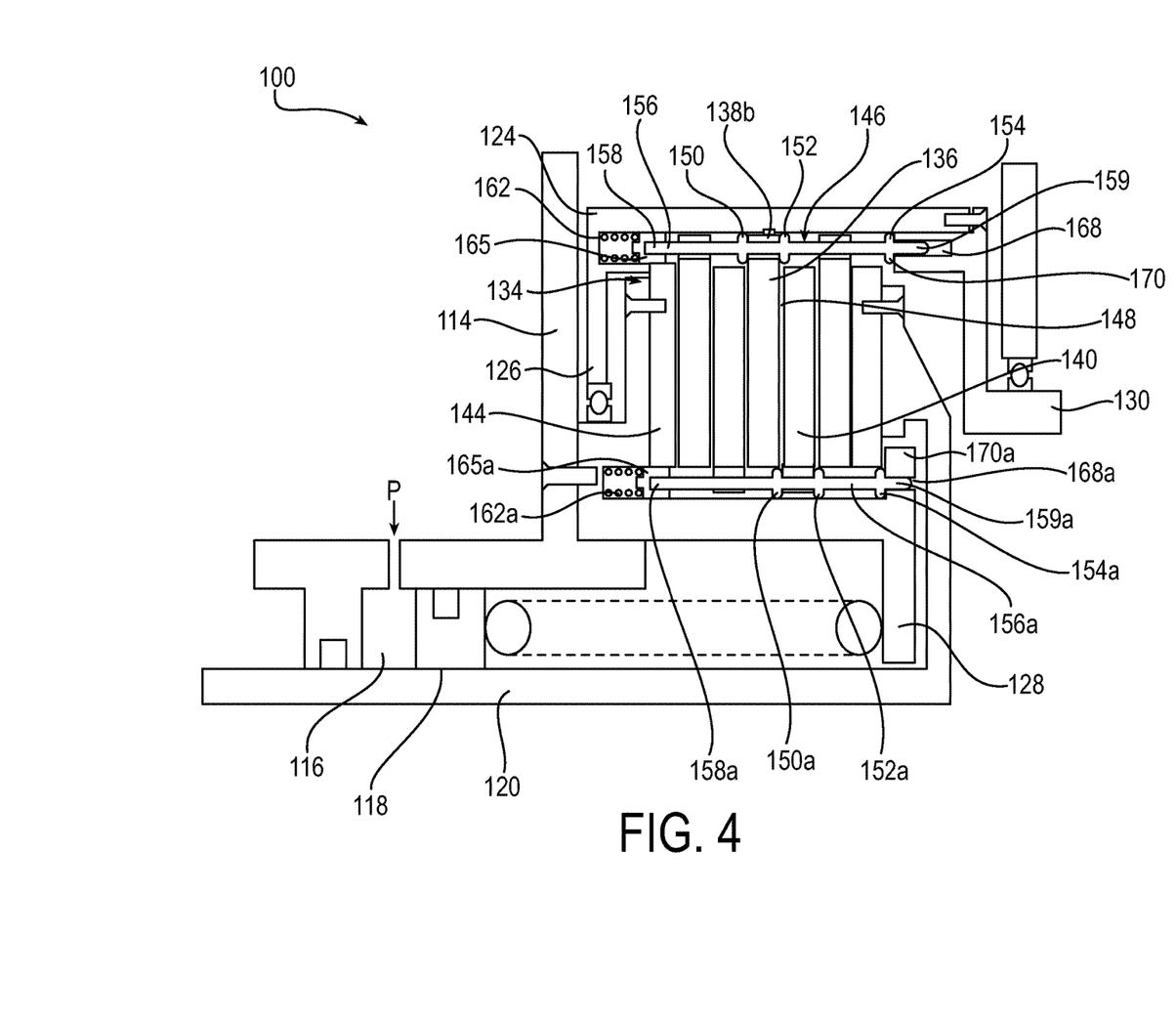
FIG. 4 is a schematic drawing depicting a sectional view of a multi-disk brake assembly according to a third embodiment.

Referring now to FIG. 4, a third exemplary embodiment of the multi-disk brake assembly 100 is schematically shown. As previously described, the brake assembly 100 may include a stationary brake housing 114, a cylindrical chamber 116, a slideable annular piston 118, a piston skirt 120, and a rotor 124. The rotor 124 may include a first portion 126 and a second portion 130 that may be coupled to an input shaft of the gear box associated with the vehicle wheel. The brake housing 114 may include a torque tube 128. The brake assembly 110 may include a brake disk stack 134 that includes a plurality of interleaving rotor disks and stator disks that are keyed to the rotor 124 and the stationary disk housing 114, respectively. The brake disk stack 134 may include at least one rotor disk 136. As shown in FIG. 4, the rotor disk 136 may be supported by the rotor 124 for rotation with the rotor 124. The rotor disk 136 may be rotatable about a longitudinal axis.

The brake disk stack 134 may also include at least one stator disk 140 that is non-rotatable and arranged along the longitudinal axis. A stator disk 144 may be an end-most disk of the brake disk stack 134. The stator disk 140 may be supported by the torque tube 128 that is fixed to the brake housing 114. The rotor disk 136 and the stator disk 140 may be axially moveable along the longitudinal axis to move between the engaged position where the disks of the disk stack 134 are engaged and the disengaged position where the disks are spaced. The disk stack 134 may be in the engaged position during the actuated mode of operation of the brake assembly 110 and in the disengaged position during the released mode of operation. The brake assembly 110 may further include an axial retention device 146 for maintaining the axial space 148 between the rotor disk 136 and the stator disk 140 during the released mode of operation. As shown in FIG. 4, the axial retention device 146 may include a set of pins, where each pin may include three collars or flanges 150, 152, 154. Any suitable number of pins or flanges may be used. The flanges 150, 152 of the pin may engage the rotor disk 136 and a third flange 154 may locate the axial retention device 146 on the rotor 130. The set of pins may include three pins per disk, and the pins may be distributed evenly around the longitudinal axis of the disk stack 134 to keep the disks parallel to one another. Each pin in the pin set may include three flanges, such that the pin set may include nine flanges. Six of the flanges may engage the rotor disk 136 while the three additional flanges may locate the axial retention device 146 on the rotor 130. As shown in FIG. 4, the rotor disk 136 has a corresponding set of pins that are represented by pin 156 and the stator disk 140 has a corresponding set of pins that are represented by pin 156a.

Each of the pins 156, 156a may be axially moveable or translatable along with the corresponding rotor disk or stator disk. The pins 156, 156a may extend parallel with the axial length of the disk stack 134 and the pins 156, 156a may be spring-loaded. The flanges 150, 152, 154 may be integral with the pin 156 and may move with the pin 156. The pins 156, 156a may be driving pins. The first flange 150 and the second flange 152 may clamp the rotor disk 136 for movement with the rotor disk 136 such that the corresponding disk drags or pulls the pin 156 and flanges 150, 152, 154 in an axial direction when the braking assembly 110 is actuated. The pin 156 may further include a third flange 154 that is axially spaced from the first flange 150 and the second flange 152. The flanges 150, 152, 154 may engage the outer or inner diameter of the corresponding disk. As shown in FIG. 4, the flanges 150, 152, 154 may be arranged to engage the outer diameter of the rotor disk 136.

The pin 156a that is associated with the stator disk 140 may extend parallel with the axial length of the disk stack 134 and each flange 150a, 152a, 154a may be integral with the pin 156a. The flanges 150a, 152a, 154a may include a first flange 150a and a second flange 152a between which the corresponding stator disk 140 is interposed. The first flange 150a and the second flange 152a may clamp the stator disk 140 for movement with the stator disk 140 such that the stator disk 140 drags or pulls the pin 156a and the flanges 150a, 152a, 154a in an axial direction when the braking assembly 110 is actuated. The flanges 150a, 152a, 154a may include a third flange 154a that is axially spaced from the first flange 150a and the second flange 152a. The flanges 150a, 152a, 154a may engage the outer or inner diameter of the stator disk 40. The flanges 150a, 152a, 154a may be arranged to engage the inner diameter of the stator disk 140. The sets of pins 156, 156a and the corresponding flanges 150, 150a, 152, 152a, 154, 154a may be arranged or spaced in any suitable configuration for retaining the axial space 148 or a plurality of axial spaces between the disks in the disk stack 134.

The pin 156 of the axial retention device 146 may include a first end 158 and a second end 159 distally opposite from the first end 158. The pin 156 may be cylindrical or rod-shaped and may extend through an aperture in the corresponding rotor disk so that the disk and the pins may be supported on the pin 156. The pin 156 may have any suitable shape. The pin 156 may extend an axial distance that is nearly equal to or greater than the axial length of the brake disk stack 134. The disk stack 134, the pins 156, 156a, and the flanges 150, 150a, 152, 152a, 154, 154a may be retained between the rotor 124 and the torque tube 128. The pin 156a of the axial retention device 146 that is associated with stator disk 140 may include a first end 158a and a second end 159a distally opposite from the first end 58a.

The third flange 154 of the rotor pin flanges 150, 152, 154 may be located at the second end 159 of the pin 156 or near or adjacent to the second end 159. The first end 158 of the pin 156 may be engageable or connected with a biasing member 162 as previously described. The biasing member 162 may be engageable with a cap 165 that is mounted on the first end 158 of the pin 156 such that the biasing member 162 may act against the first end 158 of the pin 156 to move the pin 156 and the flanges 150, 152, 154. The cap 165 may surround the first end 158. The second end 159 of the pin 156 may be supported within a bore 168 that is integral with the rotor 124 or portion 130 of the rotor 124. The pin 156 may be moveable by the biasing member 162 such that the second end 159 of the pin 156 may be axially slideable within the bore 168.

The third flange 154a of the stator pin flanges 150a, 152a, 154a may be located at the second end 159a of the pin 156a or near or adjacent to the second end 159a. The first end 158a of the pin 156a may be engageable or connected with a biasing member 162a as previously described. The biasing member 162a may be engageable with a cap 165a that is mounted on the first end 158a of the pin 156a such that the biasing member 162a may act against the first end 158a of the pin 156a to move the pin 156a and the flanges 150a, 152a, 154a. The cap 165a may surround the first end 158a. The second end 159a of the pin 156a may be supported within a bore 168a that is integral with the stationary brake housing 114 or the torque tube 128 that is fixed to the stationary brake housing 114. The bore 168a may be a through-bore that extends fully through the torque tube 128. The pin 156a may be moveable by the biasing member 162a such that the second end 159a of the pin 156a may be axially slideable within the bore 168a. Although two pins that each have three flanges are shown in FIG. 4 and described herein, any number of pins or flanges may be used. Each pin and flange set may have a structure similar to the pin sets described herein.

When the brake assembly 110 is actuated for the braking function, the disk stack 134 may be compressed as previously described. When the disk stack 134 is compressed during the actuated mode of operation of the braking assembly 110, the pins 156, 156a may be axially slideable in an axial direction that is opposite of the direction of the biasing force of the springs 162, 162a. The pins 156, 156a and flanges 150, 150a, 152, 152a, 154, 154a are pulled or dragged with the disks. Using the axially translatable pin set is advantageous in that the normal braking function of the brake assembly 110 is not affected. The pins may perform the spacing retention function only when the brake assembly 110 is released and the disk stack 134 is in the disengaged position.

When the brake assembly 110 is released, the biasing springs 162, 162a may force the pins 156, 156a and flanges 150, 150a, 152, 152a, 154, 154a in an axial direction against a supporting structure, such that the third flange 154, 154 engages an end wall 170 of the rotor 124 or an end wall 170a of the torque tube 128. The pins may maintain the axial space 148 between the disks such that the rotor disk 136 or rotor disks may be freely rotatable without engaging the stator disk or disks. The pins are biased by the springs 162, 162a to prevent axial movement of the rotor disks or the stator disks. When the brake assembly 110 is in the released mode of operation, the third flanges 154, 154a may act as stopping flanges. The pin set holds the disks in a predetermined position as previously described and the force of the biasing springs is large enough to hold the disks in the predetermined position when the brake assembly 100 is subject to accelerated loads or inertial loads during the released mode of operation.

A brake disk assembly may include a stator disk that is non-rotatable, a rotor disk arranged adjacently and coaxially with the stator disk, and an axial retention device. The rotor disk may be rotatable. The stator disk and the rotor disk may be axially moveable between an engaged position in which the stator disk and the rotor disk are engaged and a disengaged position in which the stator disk and the rotor disk are spaced apart. The axial retention device may be axially moveable and supports at least one of the stator disk and the rotor disk for maintaining a predetermined space between the stator disk and the rotor disk when in the disengaged position. The axial retention device may maintain the predetermined space when forces due to vehicle acceleration or cornering act on the brake disk assembly.

The axial retention device may include a set of pins or bolts that position the stator disk and the rotor disk relative to a fixed structure when the stator disk and the rotor disk are in the disengaged position, the set of pins or bolts being configured to allow the stator disk and the rotor disk to engage each other when in the engaged position.

The set of pins may include a plurality of spring-loaded driving pins and a plurality of stopping pins, the rotor disk or the stator disk being interposed between the plurality of driving pins and the plurality of stopping pins.

The axial retention device may include a spring that is engageable with the driving pins for biasing the rotor disk or the stator disk in a first axial direction against the stopping pins when the stator disk and the rotor disk are in the disengaged position.

The brake disk assembly may include a plurality of springs that are each pre-loaded.

The set of pins may include three driving pins and three stopping pins, where each of the three spring-loaded driving pins maybe axially aligned with one of the three stopping pins.

The three spring-loaded driving pins and the three stopping pins may be circumferentially and evenly spaced from one another.

The brake disk assembly may include a plurality of stator disks and a plurality of rotor disks that are interleaved with one another.

The axial retention device may include a plurality of sets of pins or bolts, where each of the plurality of stator disks and the plurality of rotor disks are supported by one of the plurality of sets of pins or bolts.

The stator disk and the rotor disk may be spaced from one another by a distance between 0.08 millimeters and 1.20 millimeters when in the disengaged position, such that the rotor disk is freely rotatable in the disengaged position.

A braking system may be arranged in a vehicle and has an actuated mode of operation and a released mode of operation. The braking system may include a static structure fixed to the vehicle, a rotor that is rotatable relative to the static structure, a disk stack having a stator disk and a rotor disk, and an axial retention device. The stator disk may be non-rotatable and supported by the static structure. The rotor disk may be supported by the rotor for rotation with the rotor and arranged adjacently and coaxially with the stator disk. The stator disk and the rotor disk may be axially moveable to engage one another during the actuated mode of operation and disengage from one another during the released mode of operation. The axial retention device may be axially moveable and supports at least one of the stator disk and the rotor disk for maintaining a predetermined space between the stator disk and the rotor disk during the released mode of operation. The axial retention device may maintain the predetermined space when forces due to vehicle acceleration or cornering act on the disk stack.

The axial retention device may include a set of pins or bolts that position the stator disk and the rotor disk relative to a fixed structure when the stator disk and the rotor disk during the released mode of operation, the set of pins or bolts being configured to allow the stator disk and the rotor disk to engage each other during the actuated mode of operation.

The set of pins may include a plurality of spring-loaded driving pins and a plurality of stopping pins, the rotor disk or the stator disk being interposed between the plurality of driving pins and the plurality of stopping pins.

The axial retention device may include a spring that is engageable with the driving pins for biasing the rotor disk or the stator disk in a first axial direction against the stopping pins during the released mode of operation, the stopping pins being engaged against the static structure.

The axial retention device may include three springs, where the set of pins includes three spring-loaded driving pins and three stopping pins and each of the three spring-loaded driving pins may be engageable with one of the three springs A method of operating the multi-disk brake assembly may include applying pressure to release the rotor disk and the stator disk from engagement during the released mode of operation, using a set of spring-loaded pins or bolts to bias the rotor disk and the stator disk in a first axial direction, wherein the set of spring-loaded pins or bolts position the rotor disk and the stator disk in a predetermined position to create the predetermined space between the rotor disk and the stator disk, maintaining the predetermined space between the rotor disk and the stator disk during the released mode of operation using the biasing force of the spring-loaded pins or bolts, and using the rotor disk or the stator disk to push at least one pin or bolt of the set of spring-loaded pins or bolts in a second axial direction during the actuated mode of operation.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A brake disk assembly comprising:
a plurality of stator disks that are non-rotatable;
a plurality of rotor disks arranged adjacently and coaxially with the plurality of stator disks, the plurality of rotor disks being rotatable, the plurality of stator disks and the plurality of rotor disks being axially moveable between an engaged position in which the plurality of stator disks and the plurality of rotor disks are engaged and a disengaged position in which the plurality of stator disks and the plurality of rotor disks are spaced apart; and
an axial retention device that is axially moveable and supports the plurality of stator disks and the plurality of rotor disks for maintaining a predetermined space between the stator disk and the rotor disk when in the disengaged position, wherein the axial retention device includes sets of pins or bolts, wherein a first set of pins or bolts supports a single stator disk and a second set of pins or bolts supports a single rotor disk,
wherein the sets of pins or bolts position the plurality of stator disks and the plurality of rotor disks relative to a fixed structure when in the disengaged position, the sets of pins or bolts being configured to allow the plurality of stator disks and the plurality of rotor disks to engage each other when in the engaged position,
wherein at least one of the first set of pins or bolts and the second set of pins or bolts includes a plurality of spring-loaded driving pins or bolts and a plurality of stopping pins or bolts, and
wherein the axial retention device includes a plurality of springs engageable with the plurality of driving pins or bolts for biasing the corresponding rotor disk or stator disk in an axial direction against the fixed structure when the plurality of stator disks and the plurality of rotor disks are in the disengaged position.

2. The brake disk assembly of claim 1 further comprising the plurality of springs that are each pre-loaded.

3. The brake disk assembly of claim 1, wherein the at least one of the first set of pins or bolts and the second set of pins or bolts includes three spring-loaded driving pins and three stopping pins, each of the three spring-loaded driving pins being axially aligned with one of the three stopping pins.

4. The brake disk assembly of claim 3, wherein the three spring-loaded driving pins and the three stopping pins are circumferentially and evenly spaced from one another.

5. The brake disk assembly of claim 1, wherein the plurality of stator disks and the plurality of rotor disks that are interleaved with one another.

6. The brake disk assembly of claim 1, wherein the plurality of stator disks and the plurality of rotor disks are spaced from one another by a distance between 0.08 millimeters and 1.20 millimeters when in the disengaged position, the plurality of rotor disks being freely rotatable in the disengaged position.

7. The brake disk assembly of claim 1, wherein one of the plurality of spring-loaded driving pins or bolts is radially spaced relative to one of the plurality of stoppings pins or bolts.

8. The brake disk assembly of claim 7, wherein the one of the plurality of spring-loaded driving pins or bolts is connected to the one of the plurality of stoppings pins or bolts by a radially extending member.

9. The brake disk assembly of claim 1, wherein one of the plurality of spring-loaded driving pins or bolts is radially aligned relative to one of the plurality of stoppings pins or bolts.

10. A braking system that is arranged in a vehicle and has an actuated mode of operation and a released mode of operation, the braking system comprising:
the brake disk assembly according to claim 1;
a static structure fixed to the vehicle; and
a rotor that is rotatable relative to the static structure;
wherein the plurality of stator disks are supported by the static structure, the plurality of rotor disks being supported by the rotor for rotation with the rotor, the plurality of stator disks and the plurality of rotor disks being axially moveable to engage one another during the actuated mode of operation and disengage from one another during the released mode of operation.

11. A method of operating a multi-disk brake assembly having an actuated mode of operation and a released mode of operation, the method comprising:
applying pressure to release a plurality of rotor disks and a plurality of stator disks from engagement during the released mode of operation;
using sets of spring-loaded pins or bolts to bias the plurality of rotor disks and the plurality of stator disks in a first axial direction, wherein the sets of spring-loaded pins or bolts position the plurality of rotor disks and the plurality of stator disks relative to a fixed structure in a predetermined position to create a predetermined space between the plurality of rotor disks and the plurality of stator disks;
maintaining the predetermined space between the plurality of rotor disks and the plurality of stator disks during the released mode of operation using a biasing force of the spring-loaded pins or bolts, wherein a first set of pins or bolts supports a single stator disk and a second set of pins or bolts supports a single rotor disk, wherein at least one of the first set of pins or bolts and the second set of pins or bolts includes a plurality of spring-loaded driving pins or bolts and a plurality of stopping pins or bolts;
using a plurality of springs engageable with the plurality of driving pins or bolts for biasing the corresponding rotor disk or stator disk in the first axial direction against the fixed structure when the plurality of stator disks and the plurality of rotor disks are in the disengaged position; and using the plurality of rotor disks or the plurality of stator disks to push at least one pin or bolt of the set of spring-loaded pins or bolts in a second axial direction during the actuated mode of operation.

12. A brake disk assembly comprising:

a stator disk that is non-rotatable;

a rotor disk arranged adjacently and coaxially with the stator disk, the rotor disk being rotatable, the stator disk and the rotor disk being axially moveable between an engaged position in which the stator disk and the rotor disk are engaged and a disengaged position in which the stator disk and the rotor disk are spaced apart; and an axial retention device that is axially moveable and supports at least one of the stator disk and the rotor disk for maintaining a predetermined space between the stator disk and the rotor disk when in the disengaged position, wherein the axial retention device includes a set of pins that position the stator disk and the rotor disk relative to a fixed structure when the stator disk and the rotor disk are in the disengaged position, the set of pins being configured to allow the stator disk and the rotor disk to engage each other when in the engaged position, and wherein the set of pins includes a plurality of spring-loaded driving pins and a plurality of stopping pins, the rotor disk or the stator disk being interposed between the plurality of driving pins and the plurality of stopping pins, wherein the axial retention device includes a plurality of springs engageable with the plurality of driving pins for biasing the rotor disk or the stator disk in a first axial direction against the plurality of stopping pins when the stator disk and the rotor disk are in the disengaged position.

13. The brake disk assembly of claim 1 further comprising the plurality of springs that are each pre-loaded.

14. The brake disk assembly of claim 1, wherein the at least one of the first set of pins or bolts and the second set of pins or bolts includes three spring-loaded driving pins and three stopping pins, each of the three spring-loaded driving pins being axially aligned with one of the three stopping pins.

15. The brake disk assembly of claim 14, wherein the three spring-loaded driving pins and the three stopping pins are circumferentially and evenly spaced from one another.

16. The brake disk assembly of claim 12 further comprising a plurality of stator disks and a plurality of rotor disks that are interleaved with one another.

17. The brake disk assembly of claim 16, wherein each of the plurality of stator disks and the plurality of rotor disks are supported by one sets of pins.

18. The brake disk assembly of claim 12, wherein the stator disk and the rotor disk are spaced from one another by a distance between 0.08 millimeters and 1.20 millimeters when in the disengaged position, the rotor disk being freely rotatable in the disengaged position.

19. A braking system that is arranged in a vehicle and has an actuated mode of operation and a released mode of operation, the braking system comprising the brake disk assembly according to claim 12, wherein the fixed structure is a static structure fixed to the vehicle and the braking system includes a rotor that is rotatable relative to the static structure, wherein the stator disk is supported by the static structure, the rotor disk being supported by the rotor for rotation with the rotor, the stator disk and the rotor disk being axially moveable to engage one another during the actuated mode of operation and disengage from one another during the released mode of operation.

\* \* \* \* \*